No. 830,338. PATENTED SEPT. 4, 1906.
J. W. LEDOUX.
LIQUID METER.
APPLICATION FILED JAN. 27, 1905.
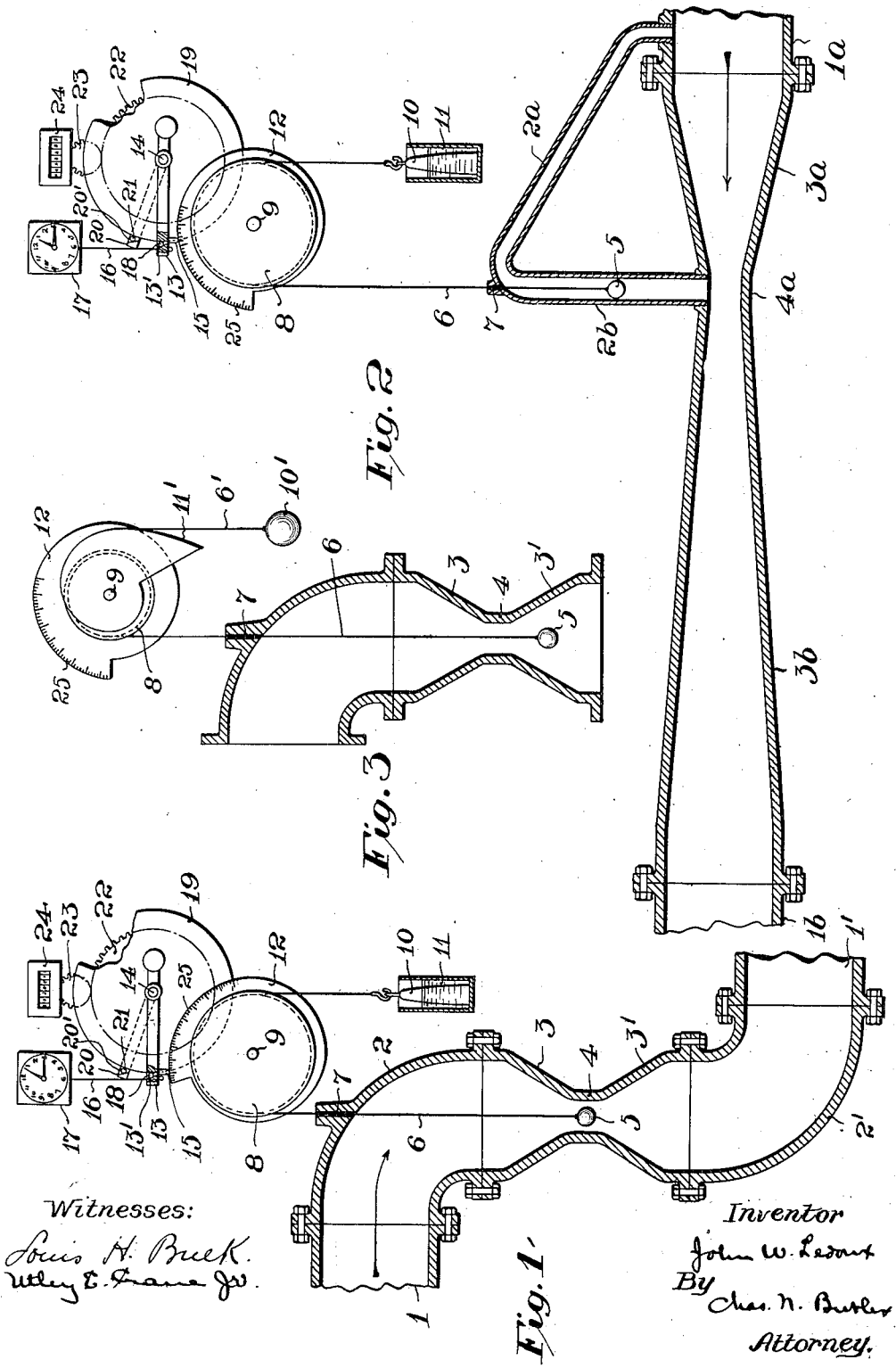

UNITED STATES PATENT OFFICE.

JOHN W. LEDOUX, OF SWARTHMORE, PENNSYLVANIA, ASSIGNOR TO SIMPLEX VALVE AND METER COMPANY, A CORPORATION OF NEW JERSEY.

LIQUID-METER.

No. 830,338.  Specification of Letters Patent.  Patented Sept. 4, 1906.

Application filed January 27, 1905. Serial No. 242,840.

*To all whom it may concern:*

Be it known that I, JOHN W. LEDOUX, a citizen of the United States, and a resident of Swarthmore, in the county of Delaware and State of Pennsylvania, have invented certain Improvements in Liquid-Meters, of which the following is a specification.

This invention relates to the measurement of liquids flowing through conduits; and it has for its leading object the production of a simple and efficient device for indicating the rate at any given period and measuring the amount of the flow taking place during a given interval.

The nature and characteristic features of the invention will appear by reference to the following description and the accompanying drawings in illustration thereof, of which—

Figure 1 represents a sectional elevation of a form of my improved apparatus. Fig. 2 represents a sectional elevation thereof, showing a modification of the conduit; and Fig. 3 represents a sectional elevation showing a modified form of the counterbalancing mechanism.

As shown in Fig. 1, the main or conduit through which flows the liquid to be measured comprises the parts 1 and 1', placed at different elevations, connected by the bends 2 and 2', and the vertical compound section composed of the conical parts 3 and 3', converging to the throat 4. A pilot or traveler 5, whose cross-sectional area is a material portion of the cross-sectional area of the throat, is suspended within the passage through the compound section by a fine wire 6, which passes through a small tubular opening 7 in the bend 2. A wheel 8, revolubly supported by the arbor 9, supports the wire, which is connected with a counterweight 10, submerged in a suitable liquid contained in a receptacle 11. A cam 12 is connected to the wheel 8 and revoluble therewith by the movement of the wire 6, attached to the wheel, through the action of the traveler 5, which is moved by changes in the velocity of flow through the compound section in which it is suspended. When the liquid in the main is at rest, the traveler 5 is held in the throat 4 through the action of the counterweight 10, which sinks to the point of maximum submergence in the fluid contained in the receptacle 11 and so that it counterbalances the traveler in the throat when the velocity of flow is zero. When there is a flow of liquid through the conduit in the direction of the arrow, since the traveler opposes a material obstruction to the passage through the throat, it is moved from this position by a current of minimum velocity and is carried downwardly into the expanding part 3' as the velocity increases a distance proportional to the velocity, the relation between the velocity and the movement of the traveler from its initial position depending upon the rate of expansion in the part 3' and the interior contour of the compound section as also the configuration of the counterweight 10, each of which may be varied.

As shown in Fig. 2, the conduit through which flows the liquid to be measured may comprise the alined parts $1^a$ and $1^b$, connected by a compound section comprising the conical parts $3^a$ and $3^b$, converging to a throat $4^a$, a small conduit or by-pass $2^a$ $2^b$ connecting the normal section or part $1^a$ with the throat or contracted section $4^a$. The pilot or traveler 5 is suspended in the passage of the vertical part $2^b$ of the by-pass by the wire 6, which extends through the tubular opening 7 therefor and thence over the disk 8, supported by the arbor 9, to the counterweight 10, suspended in the liquid-containing vessel 11, the disk having the cam 12 connected to and revoluble therewith. The traveler being of sufficient cross-sectional area to throttle the passage through the by-pass is held in the upper part of the vertical member $2^b$ thereof when the velocity of flow in the conduit is zero, the counterweight 10 sinking to the point of greatest submergence and elevating the traveler to its highest position when no force is exerted upon the latter by liquid flowing through the by-pass. When there is a flow of liquid through the major conduit in the direction of the arrow, there will be a proportionate flow through the by-pass or minor conduit and the traveler will be carried downwardly therein as the velocity increases a distance proportional to the velocity, the relation between the velocity and the movement of the traveler depending upon the proportions of the several parts.

As shown in Fig. 3, the action of the traveler 5, (suspended as in the compound section 3 3' by the wire 6, playing in the opening 7 and attached to the disk 8,) may be counterbalanced by a counterweight 10', connected by a cord 6' to the periphery of a cam 11', which is connected to the disk and is revolved therewith by means of the arbor 9. The cams 11' and 12 being fixed together act to balance each other, and they may be loaded or the matter thereof may be adjusted to effect a perfect balance between them, so that their center of gravity and the center of revolution are the same. It will be understood that the counterweight 10' and cam 11' oppose a gradually-increasing resistance to the movement of the traveler by the gradually-increasing flow through the conduit, the movement of the traveler being thus controlled.

A lever 13, fulcrumed by the arbor 14, is provided with a tappet 15, which is adapted to make contact with the periphery of the cam 12, the lever being oscillated at a regular rate and lifted to a certain elevation by any suitable mechanism, as a cord 16 connected therewith, and reciprocated at regular intervals by the action of a clock 17, the point to which the lever will fall and the amplitude of its vibrations being regulated by the position of the cam, which has its highest point under the tappet when the velocity of flow is zero and its successively lower points thereunder as the velocity increases. A roller 18, carried by the inclined seat 13' in the lever 13, is upon the elevation of the lever wedged by its seat against the periphery of the disk 19, which is revolubly supported by the arbor 14, the disk being thereby clutched to and moved forward by the lever through an arc equal to that through which the lever is moved. In the downward movement of the lever the clutching device 18 rolls freely on the periphery of the disk, which is held against reverse movement by a stationary arm 20, having therein an inclined seat 20' and a roller 21, carried in the seat for clutching the disk against reverse movement. A spur-wheel 22, connected to and revoluble with the disk 19, drives a pinion 23 for operating a register 24 in a well-known manner.

To indicate the velocity or the rate of flow at any period, some part of the revoluble mechanism may be provided with a graduated scale acting in conjunction with a pointer, as by the scale 25 on the cam 12, which may be graduated with reference to the tappet 15 as a pointer for indicating the position of the cam and the rate of flow.

It will be understood that the proportions of the various parts coacting together may be adjusted with relation to each other so that their several effects are functions of the equation representing the flow of the liquid with relation to the passage occupied by the traveler. It will also be understood that the use of the expression "proportion" in the description and claims is to be taken in the general meaning of varying with or, as in the case of the traveler, its movement in proportion to the flow through the passage in which it acts is some function of the equation representing such flow.

Having described my invention, I claim—

1. In apparatus of the class described, a conduit having a contracted passage, a rectilineally-moving device reciprocated in said passage with variations in the rate of a fluid flowing therethrough, a support oscillating on a fixed axis and counterbalancing mechanism opposing a resistance to the movement of said device varying with the rate of flow through said passage, a register, and mechanism whereby the rate of said register is varied with said rate of flow.

2. In apparatus of the class described, a conduit, a device reciprocating in said conduit with variations in the rate of a fluid flowing therethrough, a support oscillating on a fixed axis and a counterbalance opposing a resistance to the movement of said device varying with the rate of flow through said conduit, a cam connected with and oscillated by said reciprocating device, a register and means whereby the position of said cam regulates the rate of said register.

3. In apparatus of the class described, a conduit, a device reciprocating in said conduit with variations in the rate of a fluid flowing therethrough, supporting and counterbalancing mechanism for said device comprising a cam oscillating on a stationary axis and a weight, and means for indicating the volume of flow, said means comprising a cam oscillating with said first cam, 4. In apparatus of the class described, a conduit having a Venturi section, a traveler disposed in the fluid flowing through said conduit and reciprocated by variations in the rate of the flow, a supporting mechanism oscillating on a stationary axis and comprising a flexible device connected to said traveler, a cam connected with and oscillated by said supporting mechanism, and means controlled by the position of said cam for indicating the volume of flow.

In testimony whereof I have hereunto set my hand, this 24th day of January, 1905, in the presence of the subscribing witnesses.

JOHN W. LEDOUX.

Witnesses:
ROBERT JAMES EARLEY,
UTLEY E. CRANE, Jr.